US010778882B2

United States Patent
Inoue et al.

(10) Patent No.: US 10,778,882 B2
(45) Date of Patent: Sep. 15, 2020

(54) FOCUSING POSITION ADJUSTMENT DEVICE, FOCUSING POSITION ADJUSTMENT SYSTEM, PROGRAM, AND FOCUSING POSITION ADJUSTMENT METHOD

(71) Applicant: MITSUBISHI HEAVY INDUSTRIES MACHINERY SYSTEMS, LTD., Hyogo (JP)

(72) Inventors: Masahiro Inoue, Tokyo (JP); Yohei Kojima, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 16/300,638

(22) PCT Filed: Jun. 27, 2017

(86) PCT No.: PCT/JP2017/023575
§ 371 (c)(1),
(2) Date: Nov. 12, 2018

(87) PCT Pub. No.: WO2018/061360
PCT Pub. Date: Apr. 5, 2018

(65) Prior Publication Data
US 2019/0149742 A1 May 16, 2019

(30) Foreign Application Priority Data
Sep. 30, 2016 (JP) ................. 2016-193638

(51) Int. Cl.
*H04N 5/232* (2006.01)
*G06K 9/00* (2006.01)
(Continued)

(52) U.S. Cl.
CPC ......... *H04N 5/232123* (2018.08); *G02B 7/36* (2013.01); *G03B 13/36* (2013.01);
(Continued)

(58) Field of Classification Search
CPC .......... G02B 7/36; G03B 13/36; G03B 15/00; G06K 2209/15; G06K 9/00825;
(Continued)

(56) References Cited

U.S. PATENT DOCUMENTS

2007/0126917 A1* 6/2007 Ohta ................. G03B 13/36
348/345
2009/0059062 A1 3/2009 Toguchi
(Continued)

FOREIGN PATENT DOCUMENTS

JP 08166534 A 6/1996
JP H1117905 A 1/1999
(Continued)

OTHER PUBLICATIONS

International Search Report and Written Opinion for International Application No. PCT/JP2017/023575 dated Oct. 3, 2017; 13pp.

*Primary Examiner* — Amy R Hsu
(74) *Attorney, Agent, or Firm* — Kanesaka Berner and Partners LLP

(57) ABSTRACT

A focusing adjustment unit changes a relative positions of an optical system and an element of a camera the imaging direction of which faces a predetermined target shooting position from a first side to a second side in an imaging direction. Each time the focusing adjustment unit changes the relative position of the optical system and the element, an evaluation unit calculates an evaluation score monotonically increasing relative to a standard deviation in an adjustment range of an image captured by the camera, the adjustment range being such that an adjustment member a pattern
(Continued)

of a plurality of colors provided at the target shooting position comes out. A focusing position determination unit determines a focusing position of the camera based on a change of the evaluation score calculated by the evaluation unit.

6 Claims, 12 Drawing Sheets

(51) Int. Cl.
    *G02B 7/36*     (2006.01)
    *G03B 13/36*     (2006.01)
    *G08G 1/04*     (2006.01)
    *G08G 1/017*     (2006.01)
    *G06K 9/32*     (2006.01)
    *G03B 15/00*     (2006.01)

(52) U.S. Cl.
    CPC ......... *G06K 9/00825* (2013.01); *G06K 9/325* (2013.01); *G08G 1/017* (2013.01); *G08G 1/04* (2013.01); *H04N 5/232* (2013.01); *G03B 15/00* (2013.01); *G06K 2209/15* (2013.01)

(58) Field of Classification Search
    CPC .......... G06K 9/325; G08G 1/017; G08G 1/04; H04N 5/232; H04N 5/232123
    See application file for complete search history.

(56) References Cited

U.S. PATENT DOCUMENTS

| 2010/0194966 | A1* | 8/2010 | Abe | H04N 5/23209 |
| | | | | 348/345 |
| 2011/0285897 | A1* | 11/2011 | Fujii | G06K 9/2027 |
| | | | | 348/345 |
| 2015/0124129 | A1* | 5/2015 | Aoki | G03B 13/36 |
| | | | | 348/280 |
| 2016/0379487 | A1* | 12/2016 | Voeller | G06K 9/00825 |
| | | | | 340/937 |

FOREIGN PATENT DOCUMENTS

| JP | 2004294965 A | 10/2004 |
| JP | 2006154393 A | 6/2006 |
| JP | 2007264087 A | 10/2007 |
| JP | 2008003144 A | 1/2008 |
| JP | 2008170507 A | 7/2008 |

\* cited by examiner

FOCUSING POSITION ADJUSTMENT DEVICE, FOCUSING POSITION ADJUSTMENT SYSTEM, PROGRAM, AND FOCUSING POSITION ADJUSTMENT METHOD

RELATED APPLICATIONS

The present application is a National Phase of International Application Number PCT/JP2017/023575 filed Jun. 27, 2017 which claims priority to Japanese Application Number 2016-193638 filed Sep. 30, 2016.

TECHNICAL FIELD

The present invention relates to a focusing position adjustment device, a focusing position adjustment system, a program and a focusing position adjustment method.

This application claims priority based on JP 2016-193638 filed in Japan on Sep. 30, 2016, of which the contents are incorporated herein by reference.

BACKGROUND ART

At tollgates on a freeway, etc., vehicle identification number recognition devices are provided to capture an image of a license plate of a vehicle and recognize a vehicle identification number. Upon installation of the vehicle identification number recognition device, it is necessary to focus a camera of the vehicle identification number recognition device on a license plate. In the case of manual focusing, a focusing accuracy varies depending on an adjustment ability of an operator and thus, a recognition rate of the vehicle identification number recognition device may possibly not be constant. Conceivable examples of an approach to stabilize the recognition rate include a method of searching for a value that provides the finest image, i.e., a focusing position, by setting an imaging distance, i.e., a distance between an optical system and an element, or a focusing distance of the optical system for all possible values and then capturing the image. However, this method has a problem that it takes time to search for a focusing position.

As the method of detecting a focusing position, hill climbing (hill climbing algorithm) has been known (see, for example, Patent Document 1). The hill climbing is to capture an image while gradually changing an imaging distance in an optical axis direction so as to search for an imaging distance at which an evaluation score indicating an edge intensity of the captured image (i.e., sharpness) peaks. By adopting the hill-climbing, it is possible to search for a focusing position as well as reduce an amount of movement of the optical system or the element (this is because if a peak position is found, further focal adjustment is unnecessary). Specifically, the time necessary for searching for a focusing position can be reduced.

CITATION LIST

Patent Document

Patent Document 1: JP 2008-170507 A

SUMMARY OF INVENTION

Problems to be Solved by the Invention

Regarding an evaluation score indicating an edge intensity, a differential value (for example, a first order differential value and a second order differential value) which is a difference in density between adjacent pixels is generally used. However, in the case where a camera captures a subject image having a pattern of two distinct colors (clearly distinguished in two colors) such as a license plate, and a relationship between an imaging distance of the camera and an evaluation score defined by a differential value is graphically represented, two or more points appear at which the evaluation score peaks in some cases. Hence, when a focusing position is searched for by hill-climbing based on an evaluation score defined by a differential value, unsuitable results may possibly be obtained; for example, a local peak position different from a focusing position is erroneously found as the focusing position.

An object of the present invention is to provide a focusing position adjustment device, a focusing position adjustment system, a program, and a focusing position adjustment method, which can search for a suitable focusing position as well as reduce the time necessary for searching for a focusing position.

Solution to Problem

According to a first aspect of the present invention, a focusing position adjustment device (11) includes:

a focusing adjustment unit (113) configured to adjust an imaging distance between an optical system and an element of a camera (150), a shooting direction of the camera facing a predetermined target shooting position or to adjust a focusing distance of the optical system, so as to focus the camera;

an evaluation unit (114) configured to calculate, each time the focusing adjustment unit adjusts the imaging distance or the focusing distance, an evaluation score monotonically increasing relative to a standard deviation of density of pixels in an adjustment range of an image captured by the camera, the adjustment range being such a range that an adjustment member (12) with a pattern of a plurality of colors provided at the target shooting position comes out; and a focusing position determination unit (116) configured to determine a focusing position of the camera based on a change of the evaluation score calculated by the evaluation unit, wherein the focusing adjustment unit is configured to adjust a relative position of the element or the focusing position to the optical system from a first side to a second side in the shooting direction so as to adjust the imaging distance.

In the case of graphically representing a relationship between the imaging distance of the camera and the standard deviation of density of pixels, only one point appears, at which the standard deviation becomes maximum regardless of the shooting condition. Thus, the focusing position adjustment device according to the first aspect can search for a suitable focusing position while reducing the time necessary for searching for the focusing position.

According to a second aspect of the present invention, the focusing position adjustment device according to the first aspect further includes a condition adjustment unit (112) configured to adjust a shooting condition of the camera such that a difference between an average density of pixels in the adjustment range and a density corresponding to a ratio of the colors forming the pattern of the adjustment member is a predetermined value or less, wherein the evaluation unit is configured to calculate the evaluation score after the condition adjustment unit adjusts the shooting condition.

The average density of pixels in the adjustment range does not have a significant difference between the case where the camera focuses on the adjustment member and the case where the camera does not focus there. Thus, the focusing position adjustment device according to the second aspect can suitably adjust the shooting condition before adjustment of the focusing position of the camera.

According to a third aspect of the present invention, in the focusing position adjustment device according to the first or second aspect, the focusing adjustment unit is configured to change the relative position from a first side to a second side in the shooting direction by a first distance until the evaluation score calculated by the evaluation unit decreases, and changes the relative position from the second side to the first side in the shooting direction by a second distance shorter than the first distance when the evaluation score calculated by the evaluation unit is smaller than a previous evaluation score.

Specifically, the focusing position adjustment device according to the third aspect first searches for the focusing position from the first side to the second side, and when the evaluation score turns from increasing to decreasing, searches for the focusing position in the opposite direction so as to search for the focusing position with higher precision. Thus, the focusing position adjustment device according to the third aspect can reduce the time necessary for searching for the focusing position.

According to a fourth aspect of the present invention, in the focusing position adjustment device according to any one of the first to third aspects, the focusing adjustment unit is configured to change the relative position to a position closest to a first side in the shooting direction out of possible positions and then, changes the relative position to a second side in the shooting direction.

Specifically, the focusing position adjustment device according to the fourth aspect starts with searching at a position at which the imaging distance is shortest or longest, out of possible positions for the relative position of the optical system and the element or the focusing position. Thus, the focusing position adjustment device according to the fourth aspect can avoid such a situation that an optimum focusing position is not searched for.

According to a fifth aspect of the present invention, a focusing position adjustment system includes:

an adjustment member having a pattern of a plurality of colors; and the focusing position adjustment device according to any one of the first to fourth aspects.

According to a sixth aspect of the present invention, a program causes a computer (110) to function as:

a focusing adjustment unit configured to adjust an imaging distance between an optical system and an element of a camera, a shooting direction of the camera facing a predetermined target shooting position, or to adjust a focusing distance of the optical system, so as to focus the camera;

an evaluation unit configured to calculate, each time the focusing adjustment unit adjusts the imaging distance or the focusing distance, an evaluation score monotonically increasing relative to a standard deviation of density of pixels in an adjustment range of an image captured by the camera, the adjustment range being such a range that an adjustment member with a pattern of a plurality of colors provided at the target shooting position comes out; and a focusing position determination unit configured to determine a focusing position of the camera based on a change of the evaluation score calculated by the evaluation unit, wherein the focusing adjustment unit is configured to adjust a relative position of the element or the focusing position to the optical system from a first side to a second side in the shooting direction so as to adjust the imaging distance.

According to a seventh aspect of the present invention, a focusing position adjustment method includes:

a member installation step of installing an adjustment member at a target shooting position, the adjustment member having a pattern of a plurality of colors and a shooting direction of a camera facing the target shooting position;

a first adjustment step of changing a relative position of an element or a focusing position of the camera to an optical system of the camera from a first side to a second side in the shooting direction;

a shooting step of shooting the adjustment member with the camera each time the relative position is changed;

an evaluation step of calculating an evaluation score monotonically increasing relative to a standard deviation of density of pixels in an adjustment range of an image captured in the shooting step, the adjustment range being such a range that the adjustment member comes out; and a determination step of determining a focusing position of the camera based on a change of the evaluation score calculated in the evaluation step.

According to an eighth aspect of the present invention, the focusing position adjustment method according to the seventh aspect further includes a second adjustment step of adjusting the relative position from the second side to the first side in the shooting direction when the evaluation score calculated in the evaluation step is smaller than a previous evaluation score, wherein in the determination step, a focusing position of the camera is determined based on a change of the evaluation score after the relative position is changed in the second adjustment step, and an amount of adjustment for the relative position in the first adjustment step is larger than that in the second adjustment step.

Specifically, the focusing position adjustment method according to the eighth aspect first searches for the focusing position from the first side to the second side and when the evaluation score turns from increasing to decreasing, searches for the focusing position in the opposite direction so as to search for the focusing position with higher precision. Thus, the focusing position adjustment device according to the eighth aspect can reduce the time necessary for searching for the focusing position.

Advantageous Effect of Invention

According to at least one of the above-described aspects, the focusing position adjustment device can search for a suitable focusing position as well as reduce the time necessary for searching for a focusing position.

DESCRIPTION OF EMBODIMENTS

Overall Configuration

Embodiments will be described in detail hereinafter with reference to the appended drawings.

Figure 1:
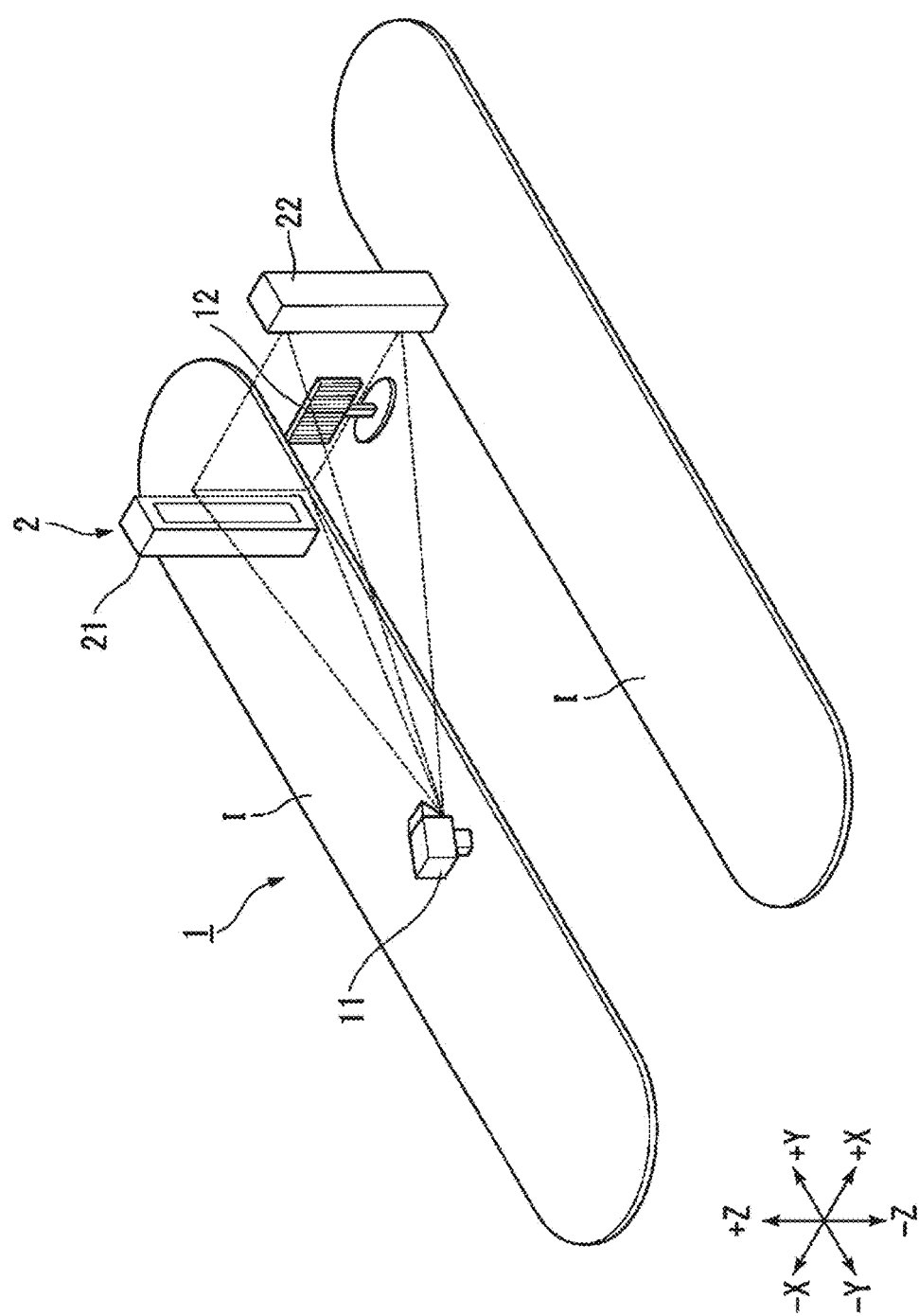
FIG. 1 is a diagram illustrating a configuration of a focusing position adjustment system according to an embodiment.

FIG. 1 is a diagram illustrating a configuration of a focusing position adjustment system according to an embodiment.

A focusing position adjustment system 1 is configured to adjust to a suitable position a relative position between an optical system and an element of a camera in a vehicle identification number recognition device 11 provided on an island I. The focusing position means a position at which a camera can capture the finest image, out of relative positions between the optical system and the element of the camera.

The vehicle identification number recognition device 11 captures an image of a license plate of a vehicle detected by a vehicle distinguisher 2 and recognizes a vehicle identification number. The vehicle identification number recognition device 11 projects infrared light toward a shooting direction and receives the reflected light so as to capture an image.

The vehicle distinguisher 2 includes a first transmission type photosensor array 21 and a second transmission type photosensor array 22, which are provided face-to-face at the islands I on opposite sides of a lane. The first transmission type photosensor array 21 emits a plurality of light beams toward the second transmission type photosensor array 22. The second transmission type photosensor array 22 detects the plurality of incident light beams from the first transmission type photosensor array 21. The vehicle distinguisher 2 detects a vehicle coming by detecting that the vehicle entering a lane blocks the light beams emitted from the first transmission type photosensor array 21. The vehicle distinguisher 2 is provided on an upstream side (near side in a travel direction, i.e., +Y direction in FIG. 1) of the vehicle identification number recognition device 11.

Specifically, the shooting direction of the camera in the vehicle identification number recognition device 11 is a direction from the camera to a position between the first transmission type photosensor array 21 and a second transmission type photosensor array 22. Also, the relative position between the optical system and the element of the camera in the vehicle identification number recognition device 11 has to be adjusted so that when a vehicle exists between the first transmission type photosensor array 21 and the second transmission type photosensor array 22, the camera can focus on a license plate of the vehicle. The position between the first transmission type photosensor array 21 and the second transmission type photosensor array 22 is given as an example of a target shooting position.

The focusing position adjustment system 1 includes the vehicle identification number recognition device 11 and an adjustment member 12.

The adjustment member 12 is configured to be image-captured by the vehicle identification number recognition device 11 as part of the focusing position adjustment processing with the vehicle identification number recognition device 11. The adjustment member 12 includes a display panel having a pattern of two colors different in density. The pattern of the display panel of the present embodiment is a stripe chart with black and while vertical stripes of the same width. The width of the vertical stripe preferably ranges from 6 mm to 20 mm. This is because the line thickness of letters or numbers of the license plate is about 11 mm. The display panel is provided at substantially the same position as a license plate of a vehicle (e.g., 50 cm above the ground). The height and width of the display plate are larger than those of a license plate of a vehicle.

Configuration of Vehicle Identification Number Recognition Device 11

The configuration of the vehicle identification number recognition device 11 will be described.

Figure 2:
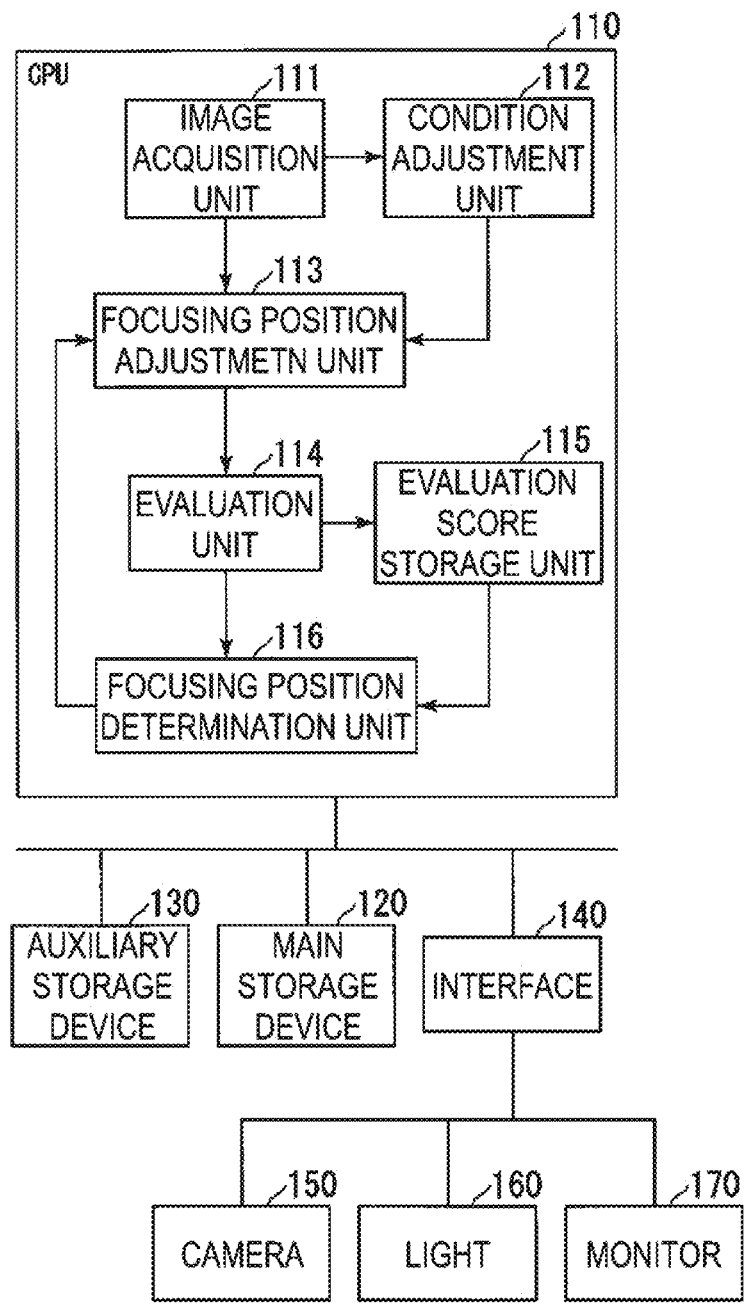
FIG. 2 is a schematic block diagram illustrating a configuration of a focusing position adjustment system according to an embodiment.

FIG. 2 is a schematic block diagram illustrating the configuration of the focusing position adjustment device according to an embodiment.

The vehicle identification number recognition device 11 includes a CPU 110, a main storage device 120, an auxiliary storage device 130, an interface 140, camera 150, a light 160, and a monitor 170.

The auxiliary storage device 130 stores a program for executing focusing position adjustment processing. The CPU 110 reads the program from the auxiliary storage device 103, develops the program in a main storage device 102, and executes the focusing position adjustment processing according to the program. Note that the auxiliary storage device 130 is an example of a non-transitory tangible medium.

The camera 150, the light 160, and the monitor 170 are connected to the CPU 110 via the interface 140.

The CPU 110 executes the program stored in the auxiliary storage device 130 to implement an image acquisition unit 111, a condition adjustment unit 112, a focusing adjustment unit 113, an evaluation unit 114, an evaluation score storage unit 115, and a focusing position determination unit 116.

The image acquisition unit 111 acquires a captured image from the camera 150.

The condition adjustment unit 112 adjusts a shutter speed of the camera 150, the brightness of the light 160, and a gain for amplifying an image based on the average density of the image captured by the image acquisition unit 111.

The focusing adjustment unit 113 adjusts an imaging distance of the camera 150. The imaging distance is a distance between the optical system and the element. For example, the focusing adjustment unit 113 can adjust the imaging distance by moving the element relative to a fixed optical system. Also, the focusing adjustment unit 113 can adjust the imaging distance, for example, by moving the optical system relative to a fixed device. Alternatively, the focusing adjustment unit 113 can adjust the imaging distance, for example, by moving both of the optical system and the element. Specifically, the focusing adjustment unit 113 adjusts the imaging distance of the camera 150 by changing a relative position between the optical system and the element.

The evaluation unit 114 calculates a standard deviation of the density distribution of pixels in the image captured by the image acquisition unit 111 as an evaluation score. The evaluation unit is configured to calculate an evaluation score, and as the evaluation score, a value monotonically increasing relative to the standard deviation of the density distribution of pixels in the image captured by the image acquisition unit 111 is used. In the present embodiment, the evaluation unit 114 uses the standard deviation itself of the density distribution of pixels in the image captured by the image acquisition unit 111 as an evaluation score. The standard deviation of the density distribution of pixels in the image captured by the image acquisition unit 111 monotonically increases relative to the standard deviation of the density distribution of pixels in the image captured by the image acquisition unit 111.

The evaluation score storage unit 115 stores the evaluation score calculated by the evaluation unit 114.

The focusing position determination unit 116 determines a focusing position of the camera 150 based on the latest evaluation score calculated by the evaluation unit 114 and a previous evaluation score stored in the evaluation score storage unit 115.

The vehicle identification number recognition device 11 is given as an example of the focusing position adjustment device.

Focal Point Adjustment Method Used in Vehicle Identification Number Recognition Device 11

Next, a focusing position adjustment method used in the vehicle identification number recognition device 11 according to the present embodiment will be described.

Figure 3:
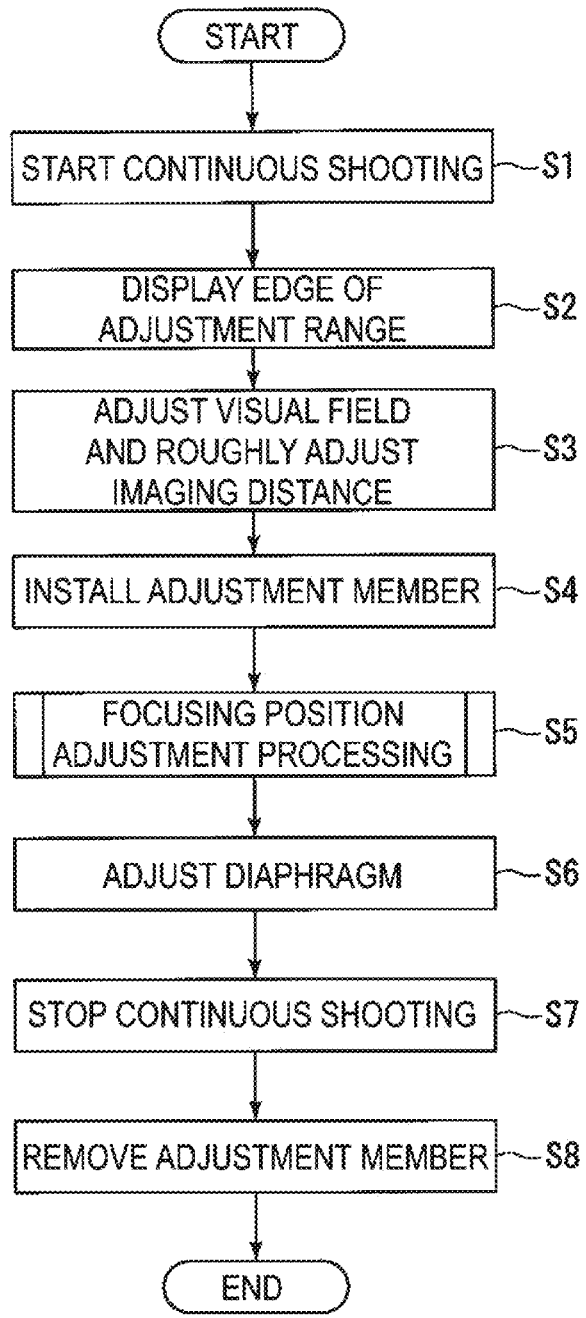
FIG. 3 is a flowchart illustrating a focusing position adjustment method used in a vehicle identification number recognition device according to an embodiment.

FIG. 3 is a flowchart illustrating the focusing position adjustment method used in the vehicle identification number recognition device according to one embodiment.

Figure 4:
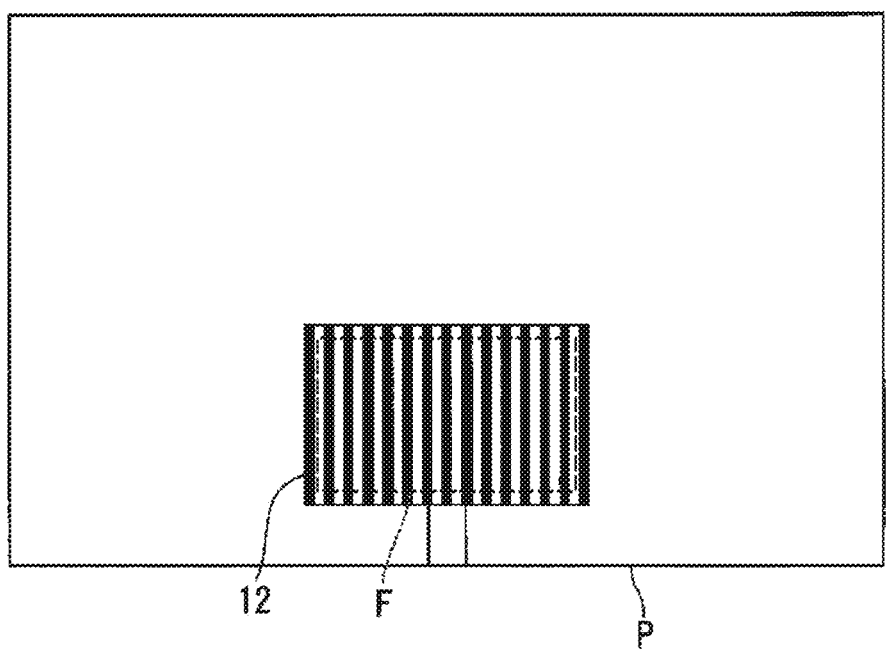
FIG. 4 illustrates an example of an image displayed on a monitor of a vehicle identification number recognition device according to an embodiment.

FIG. 4 illustrates an example of an image displayed on a monitor of the vehicle identification number recognition device according to one embodiment.

First, an operator starts the vehicle identification number recognition device 11 to cause the camera 150 to start continuous shooting (step S1). When the camera 150 starts continuous shooting, the image acquisition unit 111 acquires an image P captured by the camera 150 and displays the image on a monitor 170. Next, the operator overlays a frame F indicating an adjustment range, which is a target detection range of a license plate, on the monitor 170 as illustrated in FIG. 4 (step S2). The adjustment range of the present embodiment is a preset pixel range. On the other hand, in another embodiment, a range defined by an outline of the adjustment member 12 may be specified as the adjustment range each time through the image processing on the captured image. Next, the operator adjusts a visual field of the camera 150 and roughly adjusts the imaging distance so as to reduce the blur of the image (step S3). The rough adjustment of the imaging distance is to adjust the imaging distance to such an extent that an object existing between the first transmission type photosensor array 21 and the second transmission type photosensor array 22 can be recognized visually on the monitor 170. Therefore, at the time of step S3, the operator does not need to adjust the imaging distance of the camera 150 to the extent that the vehicle identification number can be recognized. Next, the operator installs the adjustment member 12 between the first transmission type photosensor array 21 and the second transmission type photosensor array 22 (step S4). As a result, the adjustment member can come out in an adjustment range of an image captured by the camera 150. Then, the operator inputs an instruction to execute focusing position adjustment processing to the vehicle identification number recognition device 11 (step S5). In response thereto, the CPU 110 reads a program stored in the auxiliary storage device 130 to execute focusing position adjustment processing as described later. After the completion of the focusing position adjustment processing, the vehicle identification number recognition device 11 adjusts a diaphragm (step S6). Then, the operator causes the vehicle identification number recognition device 11 to stop the continuous shooting (step S7), and takes away the adjustment member 12 (step S8).

Figure 5:
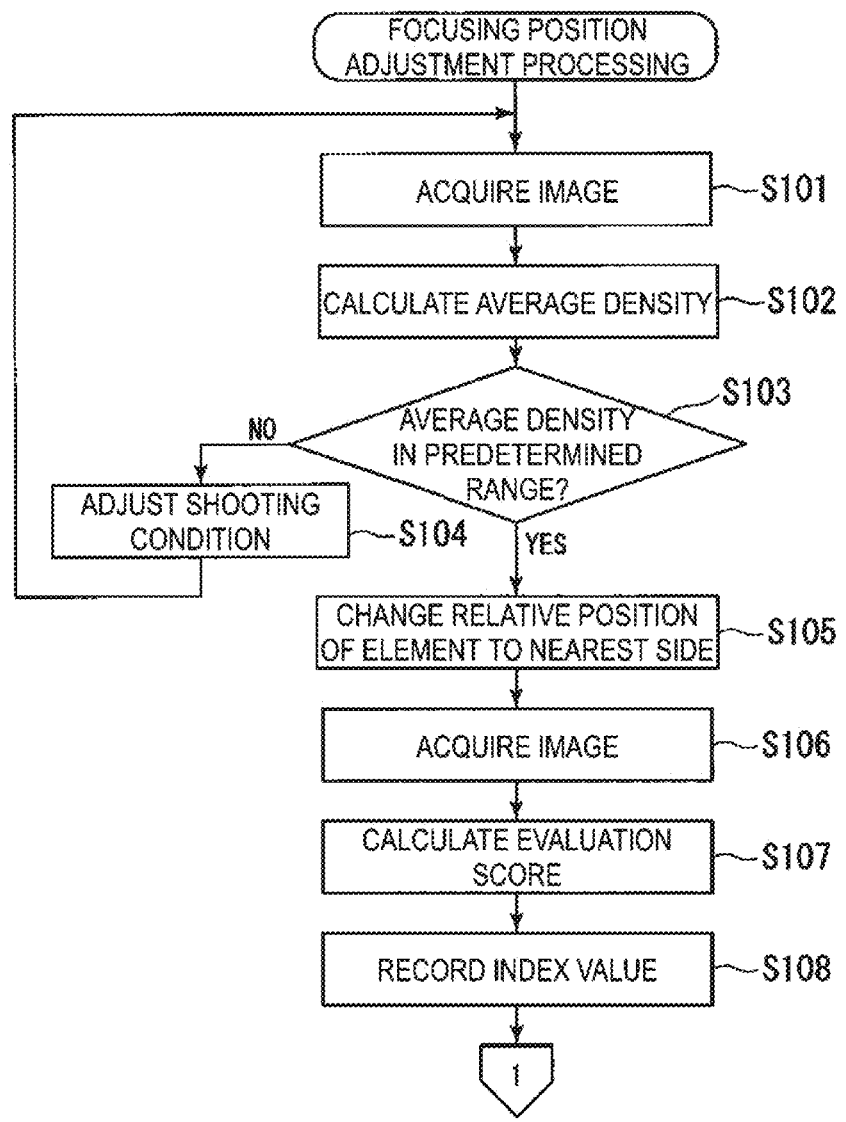
FIG. 5 is a first flowchart illustrating focusing position adjustment processing according to an embodiment.
Figure 6:
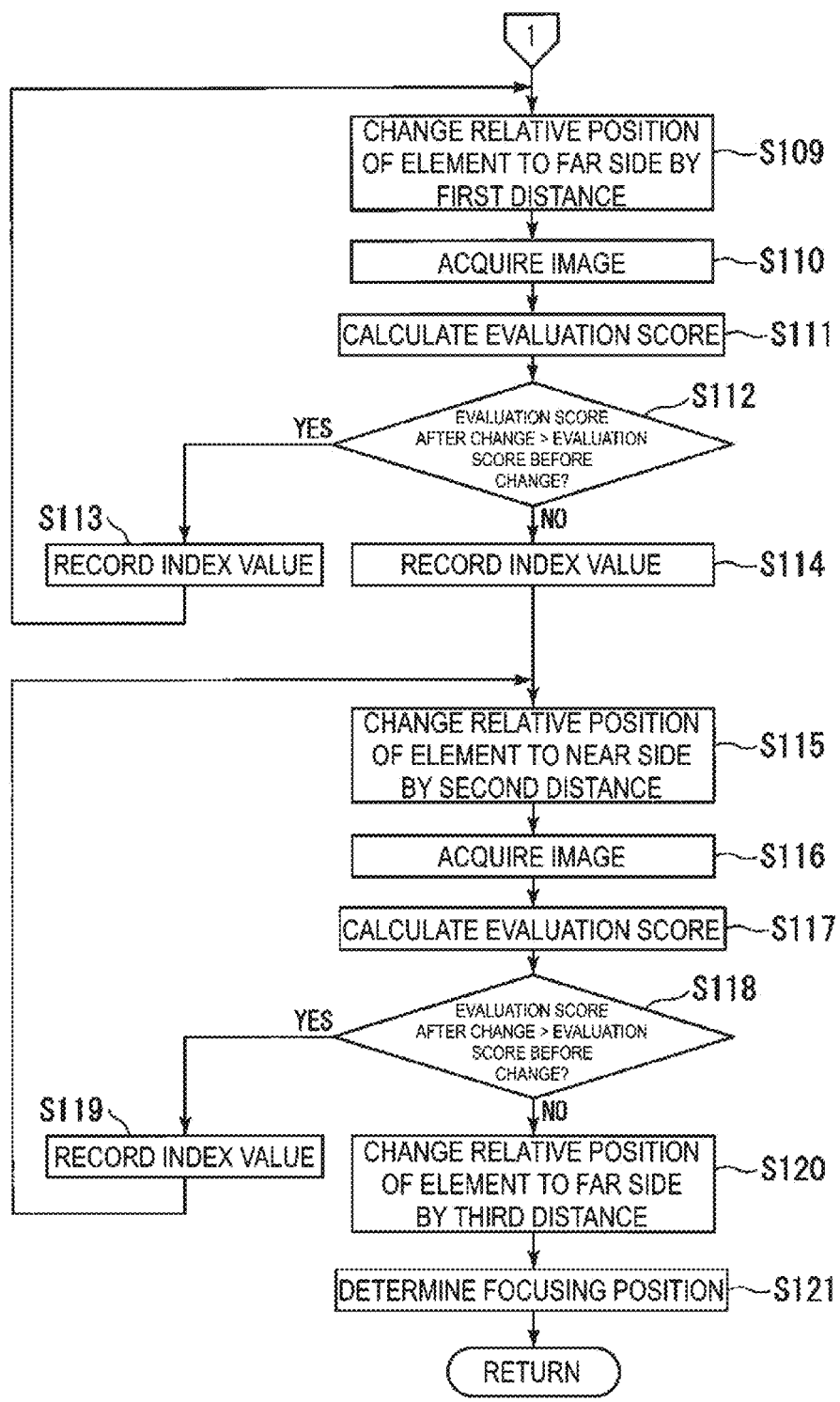
FIG. 6 is a second flowchart illustrating focusing position adjustment processing according to an embodiment.

FIG. 5 is a first flowchart illustrating focusing position adjustment processing according to one embodiment. FIG. 6 is a second flowchart illustrating focusing position adjustment processing according to one embodiment.

When the vehicle identification number recognition device 11 starts the focusing position adjustment processing, the image acquisition unit 111 acquires an image from the camera 150 (step S101). Next, the condition adjustment unit 112 calculates an average density for pixels in an adjustment range of an image captured by the image acquisition unit 111 (step S102). The condition adjustment unit 112 determines whether or not the calculated average density is within a predetermined range around a central value of the densities (step S103). For example, in the case where a range of possible densities of pixels is from 0 to 255, the condition adjustment unit 112 determines whether or not the calculated average density is in a predetermined range around 128, e.g., a range of 124 to 132.

If the average density is not in the predetermined range (step S103: NO), the condition adjustment unit 112 adjusts a shutter speed of the camera 150, the brightness of the light 160, and a gain for amplifying an image so that the average density approximates the central value of the densities (step S104). For example, when the average density is higher than the central value of the densities, the condition adjustment unit 112 decreases the shutter speed of the camera 150, increases the brightness of the light 160, or increases a gain for amplifying an image. On the other hand, when the average density is lower than the central value of the densities, the condition adjustment unit 112 increases the shutter speed of the camera 150, decreases the brightness of the light 160, or decreases a gain for amplifying an image. Then, the vehicle identification number recognition device 11 returns the processing to step S101 and determines an average density again.

On the other hand, when the average density is in the predetermined range (step S103: YES), the focusing adjustment unit 113 changes a relative position of the element to the optical system of the camera 150 to the nearest one in the shooting direction out of the possible positions (on the −Y direction side in FIG. 1 (first side)) (step S105). Next, the image acquisition unit 111 acquires an image that is captured by the camera 150 after the relative position of the element to the optical system is changed (step S106). Subsequently, the evaluation unit 114 calculates a standard deviation of density of pixels in an adjustment range of the acquired image, as an evaluation score (step S107). Then, the evaluation unit 114 records the calculated evaluation score in the evaluation score storage unit 115 (step S108).

Next, the focusing adjustment unit 113 changes the relative position of the element to the optical system of the camera 150 to a position (+Y direction side in FIG. 1) that is a first distance (500 msec) far from a current position (step S109). Specifically, the focusing adjustment unit 113 changes the relative position of the element to the optical system of the camera 150 from the near side (first side) to the far side (second side) in the shooting direction. Next, the image acquisition unit 111 acquires an image that is captured by the camera 150 after the relative position of the element to the optical system is changed (step S110). Next, the evaluation unit 114 calculates a standard deviation of density of pixels in an adjustment range of the captured image as an evaluation score (step S111). Next, the focusing position determination unit 116 determines whether or not the evaluation score calculated by the evaluation unit 114 is higher than the evaluation score stored in the evaluation score storage unit 115 (step S112). That is, the focusing position determination unit 116 determines whether or not an evaluation score after the relative position of the element to the optical system is changed is higher than the evaluation score before the change. The condition that the evaluation score after the change is higher than the evaluation score before the change means that the relative position of the element to the optical system is closer to a suitable position. The condition that the evaluation score after the change is lower than the evaluation score before the change means that the relative position of the element to the optical system is farther from the suitable position.

When the evaluation score calculated by the evaluation unit 114 is higher than the evaluation score stored in the evaluation score storage unit 115 (step S112: YES), the evaluation unit 114 overwrites and records the evaluation score in the evaluation score storage unit 115 (step S113). Then, the vehicle identification number recognition device 11 returns the processing back to step S109 and changes again the relative position of the element to the optical system of the camera 150.

On the other hand, when the evaluation score calculated by the evaluation unit 114 is equal to or less than the evaluation score stored in the evaluation score storage unit 115 (step S112: NO), the evaluation unit 114 overwrites and records the evaluation score in the evaluation score storage unit 115 (step S114). Next, the focusing adjustment unit 113 changes the relative position of the element to the optical system of the camera 150 to a position that is a second distance (e.g., 50 msec) nearer from the current position (step S115). That is, the focusing adjustment unit 113 changes the relative position of the element to the optical system of the camera 150 from a far side (second side) to a near side (first side) in the shooting direction. The second distance is shorter than the first distance. Next, the image acquisition unit 111 acquires from the camera 150 an image captured after the relative position of the element to the optical system is changed (step S116). Next, the evaluation unit 114 calculates a standard deviation of density of pixels in an adjustment range of the captured image as an evaluation score (step S117). Next, the focusing position determination unit 116 determines whether or not the evaluation score calculated by the evaluation unit 114 is higher than an evaluation score stored in the evaluation score storage unit 115 (step S118).

When the evaluation score calculated by the evaluation unit 114 is higher than an evaluation score stored in the evaluation score storage unit 115 (step S118: YES), the evaluation unit 114 overwrites and records the evaluation score on the evaluation score storage unit 115 (step S119). Then, the vehicle identification number recognition device 11 returns the processing back to step S115 and changes again the relative position of the element to the optical system of the camera 150.

On the other hand, the evaluation score calculated by the evaluation unit 114 is equal to or less than an evaluation score stored in the evaluation score storage unit 115 (step S118: NO), the focusing adjustment unit 113 changes the relative position of the element to the optical system of the camera 150 to a position that is a third distance (e.g., 30 msec) far from the current position (step S120). The third distance is shorter than the second distance. The focusing position determination unit 116 determines the position after the change in step S120 as a focusing position of the camera 150 (step S121), and terminates the processing.

As such, according to the present embodiment, the vehicle identification number recognition device 11 can suitably adjust the focusing position of the camera 150.

Evaluation Score Comparison

Figure 7:
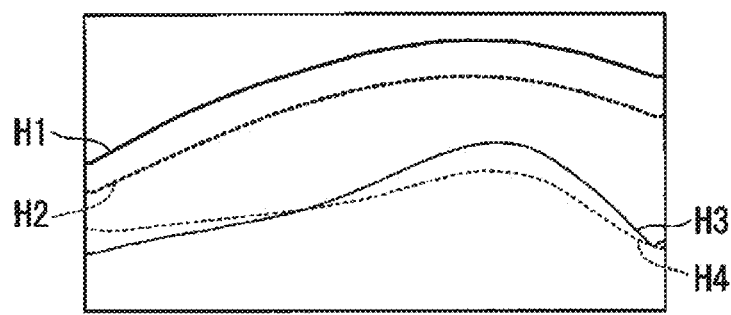
FIG. 7 is a graph obtained by using standard deviations of densities of pixels as an evaluation score for an imaging distance under shooting conditions with different patterns and installation angles of an adjustment member.
Figure 8:
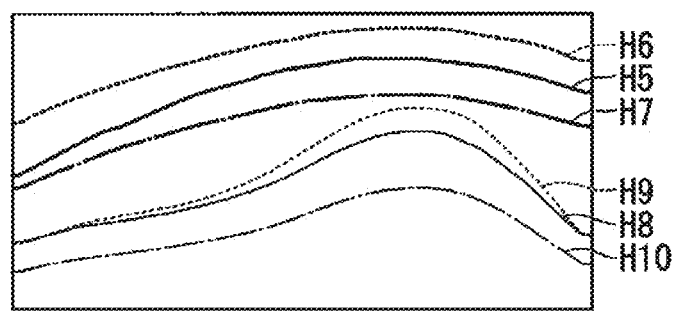
FIG. 8 is a graph obtained by using standard deviations of densities of pixels as an evaluation score for an imaging distance under shooting conditions with different patterns of an adjustment member and different shutter speeds.

FIG. 7 is a graph obtained by using standard deviations of densities of pixels as an evaluation score for an imaging distance under shooting conditions with different patterns and installation angles of the adjustment member. FIG. 8 is a graph obtained by using standard deviations of densities of pixels as an evaluation score for an imaging distance under shooting conditions with different patterns of an adjustment member and different shutter speeds. In FIGS. 7 and 8, the vertical axis represents an evaluation score and the horizontal axis represents an imaging distance.

FIGS. 7 and 8 are graphs illustrating a relationship between evaluation scores of images captured under different shooting conditions and imaging distances. A first graph H1 is obtained under shooting conditions where the width of the vertical stripe of the adjustment member 12 is 20 mm, and the installation angle of the adjustment member 12 relative to the camera 150 is 0 degrees. A second graph H2 is obtained under shooting conditions where the width of the vertical stripe of the adjustment member 12 is 20 mm, and the installation angle of the adjustment member 12 relative to the camera 150 is 30 degrees. A third graph H3 is obtained under shooting conditions where the width of the vertical stripe of the adjustment member 12 is 6 mm, and the installation angle of the adjustment member 12 relative to the camera 150 is 0 degrees. A fourth graph H4 is obtained under shooting conditions where the width of the vertical stripe of the adjustment member 12 is 6 mm, and the installation angle of the adjustment member 12 relative to the camera 150 is 30 degrees. A fifth graph H5 is obtained under shooting conditions where the width of the vertical stripe of the adjustment member 12 is 20 mm, and the shutter speed of the camera 150 is 1/3000 sec. A sixth graph H6 is obtained under shooting conditions where the width of the vertical stripe of the adjustment member 12 is 20 mm, and the shutter speed of the camera 150 is 1/4000 sec. A seventh graph H7 is obtained under shooting conditions where the width of the vertical stripe of the adjustment member 12 is 20 mm, and the shutter speed of the camera 150 is 1/6000 sec.

An eighth graph H8 is obtained under shooting conditions where the width of the vertical stripe of the adjustment member 12 is 6 mm, and the shutter speed of the camera 150 is 1/3000 sec. A ninth graph H9 is obtained under shooting conditions where the width of the vertical stripe of the adjustment member 12 is 6 mm, and the shutter speed of the camera 150 is 1/4000 sec. A tenth graph H10 is obtained under shooting conditions where the width of the vertical stripe of the adjustment member 12 is 6 mm, and the shutter speed of the camera 150 is 1/6000 sec.

Referring to FIGS. 7 and 8, all graphs have one imaging distance that provides a maximum evaluation value. Also, referring to FIGS. 7 and 8, in all graphs, the evaluation score is maximized always at a constant imaging distance. Specifically, in the case of using the standard deviation as an evaluation score for an imaging distance as in the present embodiment, even if the shooting conditions such as the width of the vertical stripe of the adjustment member 12, the shutter speed of the camera 150, and the installation angle of the adjustment member 12 relative to the camera 150 vary, only one imaging distance can provide the maximum evaluation score and the distance is constant. Hence, according to the focusing position adjustment system 1 of the present embodiment, even if the imaging distance of the camera 150 is adjusted by hill-climbing, unsuitable results are not produced and a suitable focusing position can be determined.

Here, a reason that a suitable focusing position can be found using a standard deviation of density of pixels, will be discussed below. If the imaging distance of the camera 150 is not suitable, a blurred image is captured. Hence, as the relative position between the optical system of the camera 150 and the element is farther than a suitable position, the density of each of the pixels in the adjustment range approximates an average value of two colors forming a pattern of the adjustment member 12. That is, as the relative position between the optical system of the camera 150 and the element is closer to a suitable position, the density of each of the pixels deviates more from an average value, whereby a standard deviation increases. Accordingly, with the focusing position adjustment system 1, a suitable focusing position can be determined by determining an imaging distance that provides a maximum standard deviation of density of pixels.

Here, the case where a primary differential value of densities of pixels is used as an evaluation score will be explained as a comparative example.

Figure 9:
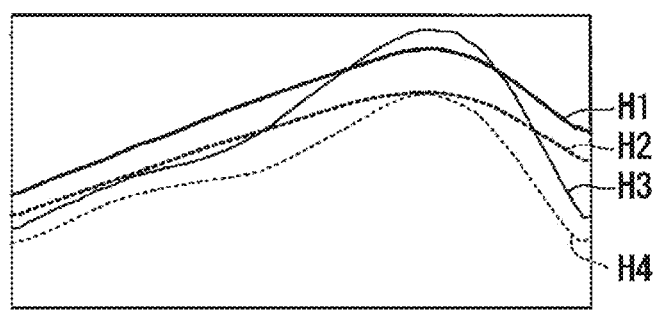
FIG. 9 is a graph obtained by using primary differential values of densities of pixels as an evaluation score for an imaging distance under shooting conditions with different patterns and installation angles of an adjustment member.
Figure 10:
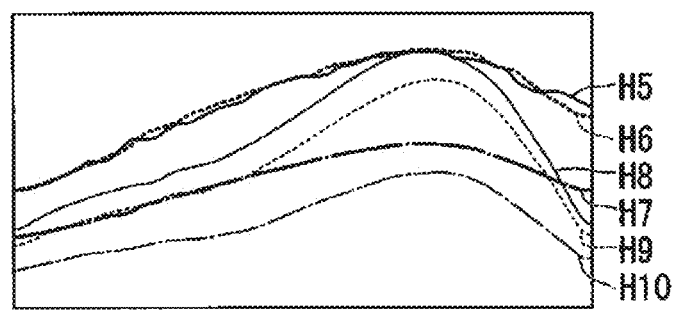
FIG. 10 is a graph obtained by using primary differential values of densities of pixels as an evaluation score for an imaging distance under shooting conditions with different patterns of an adjustment member and different shutter speeds.

FIG. 9 is a graph obtained by using primary differential values of densities of pixels as an evaluation score for an imaging distance under shooting conditions with different patterns and installation angles of an adjustment member. FIG. 10 is a graph obtained by using primary differential values of densities of pixels as an evaluation score for an imaging distance under shooting conditions with different patterns of an adjustment member and different shutter speeds. In FIGS. 9 and 10, the vertical axis represents an evaluation score and the horizontal axis represents an imaging distance.

The graphs H1 to H10 in FIGS. 9 and 10 are obtained under the same conditions in FIGS. 7 and 8. As understood from FIG. 10, in some graphs such as the fifth graph H5, the sixth graph H6, and the ninth graph H9, several imaging distances that provide a maximum evaluation score exist depending on the shooting condition. In this case, if a focusing position of the camera 150 is adjusted by hill-climbing, unsuitable results may possibly be obtained.

Also, the case where a secondary differential value of densities of pixels is used as an evaluation score will be explained as a comparative example.

Figure 11:
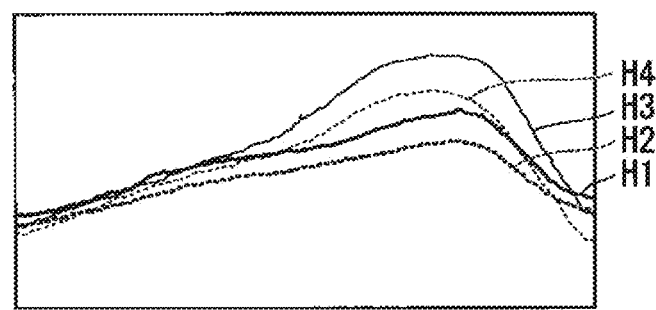
FIG. 11 is a graph obtained by using secondary differential values of densities of pixels as an evaluation score for an imaging distance under shooting conditions with different patterns and installation angles of an adjustment member.
Figure 12:
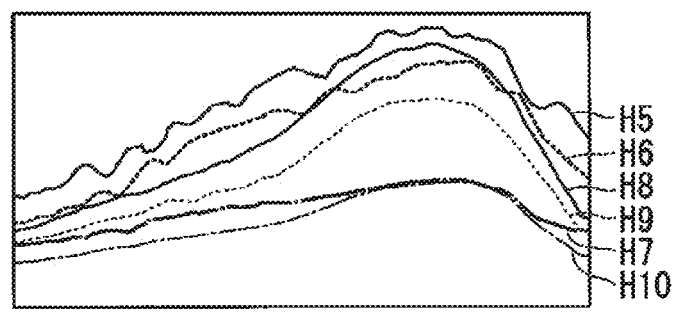
FIG. 12 is a graph obtained by using secondary differential values of densities of pixels as an evaluation score for an imaging distance under shooting conditions with different patterns of an adjustment member and different shutter speeds.

FIG. 11 is a graph obtained by using secondary differential values of densities of pixels as an evaluation score for an imaging distance under shooting conditions with different patterns and installation angles of an adjustment member. FIG. 12 is a graph obtained by using secondary differential values of densities of pixels as an evaluation score for an imaging distance under shooting conditions with different patterns of an adjustment member and different shutter speeds. In FIGS. 11 and 12, the vertical axis represents an evaluation score and the horizontal axis represents an imaging distance.

The graphs H1 to H10 in FIGS. 11 and 12 are obtained under the same conditions in FIGS. 7 and 8. As understood from FIGS. 11 and 12, under many shooting conditions (especially the first graph H1, the third graph H3, the fifth graph H5, the sixth graph H6, the seventh graph H7, and the ninth graph H9), several imaging distances that provide a maximum evaluation score exist. In this case, if a focusing position of the camera 150 is adjusted by hill-climbing, unsuitable results may possibly be obtained.

Operational Effects

As such, according to the present embodiment, the vehicle identification number recognition device 11 changes the relative position of the element to the optical system of the camera 150 in one direction as well as determines the focusing position of the camera 150 based on a change in standard deviation of density of pixels in a target adjustment range, where the adjustment member 12 comes out, of an image captured by the camera 150. As illustrated in FIG. 7, in the case of graphically representing a relationship between the imaging distance of the camera 150 and the standard deviation of density of pixels, only one point appears, at which the standard deviation is the maximum regardless of the shooting condition of the camera 150. Thus, the vehicle identification number recognition device 11 of the present embodiment can search for a suitable focusing position while reducing the time necessary for searching for the focusing position.

Also, according to the present embodiment, the vehicle identification number recognition device 11 adjusts the shooting condition of the camera 150 so that a difference between the average density of pixels in the adjustment range and a central value of a possible range of densities of pixels is within a predetermined value. The average density of pixels in the adjustment range does not have a significant difference between the case where the camera 150 focuses on the adjustment member 12 and the case where the camera 150 does not focus there. Thus, the vehicle identification number recognition device 11 can suitably adjust the shooting condition before adjustment of the focusing position of the camera 150.

Also, according to the present embodiment, the vehicle identification number recognition device 11 adjusts the relative position of the element to the optical system to the far side in the shooting direction by the first distance each time until the evaluation score is decreased and then, when the evaluation score becomes smaller than a previous value, changes the relative position of the element to the optical system to the near side in the shooting direction by the second distance shorter than the first distance each time. Specifically, the vehicle identification number recognition device 11 first searches for the focusing position from the near side to the far side, and when the evaluation score turns from increasing to decreasing, searches for the focusing position in the opposite direction so as to search for the focusing position with higher precision. As a result, the vehicle identification number recognition device 11 can reduce the time necessary for searching for the focusing position.

Also, according to the present embodiment, the vehicle identification number recognition device 11 first changes the relative position of the element to the optical system to the position closest to the near side in the shooting direction, out of possible values and then changes the relative position of the element to the optical system to the far side in the shooting direction. With this operation, the vehicle identification number recognition device 11 can avoid such a situation that an optimum focusing position is not searched for.

Modified Example

Although an embodiment has been described in detail with reference to the drawings, specific configurations are not limited to those described above, and various design changes and the like can be made.

For example, in the focusing position adjustment system 1 of the present embodiment, the vehicle identification number recognition device 11 adjusts the imaging distance of the camera 150 thereof, but the present invention is not limited thereto. For example, in the focusing position adjustment system 1 of another embodiment, a focusing position adjustment device provided independently of the vehicle identification number recognition device 11 may adjust the imaging distance of the camera of the vehicle identification number recognition device 11.

For example, the vehicle identification number recognition device 11 of the present embodiment adjusts the shooting conditions of the camera 150 so that an average density of pixels in an adjustment range approximates a predetermined value, but the present invention is not limited thereto. For example, in another embodiment, an operator may manually adjust the brightness.

Also, the focusing position adjustment system 1 of the present embodiment adjusts an imaging distance of the camera 150, but the present invention is not limited thereto. For example, the focusing position adjustment system 1 of another embodiment may adjust a focusing distance of the camera 150 in place of or in addition to the imaging distance of the camera 150. In this case, the focusing position adjustment system 1 changes the relative position of the focusing position to the optical system of the camera 150 to the far side in the shooting direction and then, changes the relative position of the focusing position to the optical system to the near side in the shooting direction.

Also, the pattern of the adjustment member 12 of the present embodiment is the stripe chart, but the present invention is not limited thereto. For example, the pattern of the adjustment member 12 of another embodiment may be checkered, striped, or other such pattern. Also, an actual license plate may be used as the display panel of the adjustment member 12 according to another embodiment. Note that the condition adjustment unit 112 of the present embodiment sets the condition so that the average density of pixels in the adjustment range becomes equal to the central value of densities based on the fact that the width of the vertical stripe is constant in the stripe chart. Accordingly, in the case of using a license plate as the display plate of the adjustment member 12, for example, it is preferred that the condition adjustment unit 112 set the condition so that the average density of pixels in the adjustment range corresponds to a ratio between the background and letter or numerical portions of the license plate. For example, in the case where a possible range of densities of pixels is in a range of 0 to 255, and the ratio between the background and letter or numerical portions of the license plate is 7:3, the condition adjustment unit 112 adjusts the shooting condition so that the calculated average density is in a predetermined range around 178, e.g., in a range of 174 to 182. In the license plate, the size and width are previously defined for each letter or number. Hence, if a string is known in advance, the density can be estimated. Thus, it is possible to calculate the average density based on the string in the license plate and in turn, adjust the shooting condition.

Also, the pattern of the adjustment member 12 according to the present embodiment is of two colors, but the present invention is not limited thereto. For example, the pattern of the adjustment member 12 according to another embodiment may include a first color group of a plurality colors with a reflectivity (reflectivity distribution relative to a wavelength) or light absorptivity (absorptivity distribution relative to the wavelength) close to the background of the license plate and a second color group of a plurality of colors with a reflectivity (reflectivity distribution relative to a wavelength) or light absorptivity (absorptivity distribution relative to the wavelength) close to the background of the license plate in terms of the density (e.g., two color groups: a blue color group and a white color group).

Also, in the present embodiment, the operator adjusts a visual field of the camera 150 and roughly adjusts the imaging distance in step S3 and thereafter, installs the adjustment member 12, but the present invention is not limited thereto. For example, according to another embodiment, the operator may install the adjustment member 12 between the first transmission type photosensor array 21 and the second transmission type photosensor array 22, and therefore adjust a visual field and roughly adjust the imaging distance or adjust the focusing distance.

Also, the vehicle identification number recognition device 11 of the present embodiment changes the relative position of the element to the optical system to the far side in the shooting direction and then changes the relative position of the element to the optical system to the near side in the shooting direction, but the present invention is not limited thereto. For example, the vehicle identification number recognition device 11 according to another embodiment may change the relative position of the element to the optical system from the near side to the far side in the shooting direction with higher precision at an initial stage so as to determine a focusing position by search in one direction. The same applies to another embodiment that adopts the focusing distance.

Also, according to the present embodiment, the vehicle identification number recognition device 11 first changes the relative position of the element to the optical system to the position closest to the near side in the shooting direction out of possible positions and then, changes the relative position of the element to the optical system to the far side in the shooting direction, but the present invention is not limited thereto. For example, the vehicle identification number recognition device 11 according to another embodiment may first change the relative position of the element to the optical system to the position close to the far side in the shooting direction out of possible positions and then, change the relative position of the element to the optical system to the near side in the shooting direction. Also, the vehicle identification number recognition device 11 according to another embodiment may not set a start point of changing the relative position of the element to the optical system to the nearest or farthest side and instead, may set a position designated by the operator as the start point. The same applies to another embodiment that adopts the focusing distance.

Also, the evaluation unit 114 of the present embodiment calculates a standard deviation of density of pixels as an evaluation score, but the present invention is not limited thereto. For example, the evaluation unit 114 according to another embodiment may calculate another value that monotonically increases relative to the standard deviation, as an evaluation score. Conceivable examples of the value monotonically increasing relative to the standard deviation include a distribution of densities of the pixels, a sum of absolute values of differences between densities of the respective pixels and an average value of densities, or a distance between two peaks that appear on a graph representing a relationship between the density of each pixel and the number of pixels.

Moreover, the program of the present embodiment is stored in the auxiliary storage device 130, but the present invention is not limited thereto. For example, the program of another embodiment may be recorded in another non-transitory tangible medium. Other examples of the non-transitory tangible medium include a magnetic disk, a magneto-optical disk, a Compact Disc Read Only Memory (CD-ROM), a Digital Versatile Disc Read Only Memory (DVD-ROM), Semiconductor memory, and the like connected via the interface 140. Also, according to another embodiment, the program may be delivered to the vehicle identification number recognition device 11 via a communication line. In this case, after having received the delivered program, the vehicle identification number recognition device 11 develops the program on the main storage device 120 and executes the above-described processing. Also, the program may be a program for realizing part of the functions described above. In addition, the program may be a so-called differential file (differential program) that realizes the above-described functions in combination with other programs already stored in the auxiliary storage device 130.

INDUSTRIAL APPLICABILITY

According to at least one of the above-described aspects, the focusing position adjustment device may search for a suitable focusing position as well as reduce the time necessary for searching for the focusing position.

REFERENCE SIGNS LIST

1 Focusing position adjustment system
2 Vehicle distinguisher
11 Vehicle identification number recognition device
12 Adjustment member
111 Image acquisition unit
112 Condition adjustment unit
113 Focusing adjustment unit
114 Evaluation unit
115 Evaluation score storage unit
116 Focusing position determination unit
150 Camera

The invention claimed is:
1. A focusing position adjustment device, comprising:
a focusing adjustment unit configured to adjust an imaging distance between an optical system and an element of a camera, a shooting direction of the camera facing a predetermined target shooting position, or to adjust a focusing distance of the optical system, so as to focus the camera;
an evaluation unit configured to calculate, each time the focusing adjustment unit adjusts the imaging distance or the focusing distance, an evaluation score monotonically increasing relative to a standard deviation of density of pixels in an adjustment range of an image captured by the camera, the adjustment range being such a range that an adjustment member with a pattern of a plurality of colors provided at the target shooting position comes out; and
a focusing position determination unit configured to determine a focusing position of the camera based on a change of the evaluation score calculated by the evaluation unit,
wherein the focusing adjustment unit is configured to change a relative position of the element or the focusing position to the optical system from a first side to a second side in the shooting direction by a first distance until the evaluation score calculated by the evaluation unit decreases from a previous evaluation score, and change the relative position from the second side to the first side in the shooting direction by a second distance shorter than the first distance when the evaluation score calculated by the evaluation unit is smaller than the previous evaluation score, so as to adjust the imaging distance.

2. The focusing position adjustment device according to claim 1, further comprising a condition adjustment unit configured to adjust a shooting condition of the camera such that a difference between an average density of pixels in the adjustment range and a density corresponding to a ratio of the colors forming the pattern of the adjustment member is a predetermined value or less,
wherein the evaluation unit is configured to calculate the evaluation score after the condition adjustment unit adjusts the shooting condition.

3. The focusing position adjustment device according to claim 1, wherein the focusing adjustment unit is configured to change the relative position to a position closest to a first side in the shooting direction out of possible positions and then, change the relative position to a second side in the shooting direction.

4. A focusing position adjustment system, comprising:
an adjustment member having a pattern of a plurality of colors; and
the focusing position adjustment device according to claim 1.

5. A non-transitory computer readable medium storing a program causing a computer to function as:
a focusing adjustment unit configured to adjust an imaging distance between an optical system and an element of a camera, a shooting direction of the camera facing a predetermined target shooting position, or to adjust a focusing distance of the optical system, so as to focus the camera;
an evaluation unit configured to calculate, each time the focusing adjustment unit adjusts the imaging distance or the focusing distance, an evaluation score monotonically increasing relative to a standard deviation of density of pixels in an adjustment range of an image captured by the camera, the adjustment range being such a range that an adjustment member with a pattern of a plurality of colors provided at the target shooting position comes out; and a focusing position determination unit configured to determine a focusing position of the camera based on a change of the evaluation score calculated by the evaluation unit, wherein the focusing adjustment unit is configured to change a relative position of the element or the focusing position to the optical system from a first side to a second side in the shooting direction by a first distance until the evaluation score calculated by the evaluation unit decreases from a previous evaluation score, and change the relative position from the second side to the first side in the shooting direction by a second distance shorter than the first distance when the evaluation score calculated by the evaluation unit is smaller than the previous evaluation score, so as to adjust the imaging distance.

6. A focusing position adjustment method, comprising:

a member installation step of installing an adjustment member at a target shooting position, the adjustment member having a pattern of a plurality of colors and a shooting direction of a camera facing the target shooting position;

a first adjustment step of changing a relative position of an element or a focusing position of the camera to an optical system of the camera from a first side to a second side in the shooting direction by a first distance;

a shooting step of shooting the adjustment member with the camera each time the relative position is changed;

an evaluation step of calculating an evaluation score monotonically increasing relative to a standard deviation of density of pixels in an adjustment range of an image captured in the shooting step, the adjustment range being such a range that the adjustment member comes out;

a second adjustment step of adjusting the relative position from the second side to the first side in the shooting direction by a second distance when the evaluation score calculated in the evaluation step is smaller than a previous evaluation score, the second distance being shorter than the first distance; and a determination step of determining a focusing position of the camera based on a change of the evaluation score calculated in the evaluation step after the relative position is changed in the second adjustment step.

* * * * *